United States Patent
Patzelt

(10) Patent No.: US 12,438,501 B2
(45) Date of Patent: Oct. 7, 2025

(54) METHOD FOR POWER CONTROL

(71) Applicant: Siemens Mobility GmbH, Munich (DE)

(72) Inventor: Klaus Patzelt, Petershausen (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/711,697

(22) PCT Filed: Nov. 9, 2022

(86) PCT No.: PCT/EP2022/081229
§ 371 (c)(1),
(2) Date: May 20, 2024

(87) PCT Pub. No.: WO2023/094150
PCT Pub. Date: Jun. 1, 2023

(65) Prior Publication Data
US 2025/0015754 A1    Jan. 9, 2025

(30) Foreign Application Priority Data
Nov. 24, 2021 (DE) ............ 10 2021 213 231.6

(51) Int. Cl.
*H02S 40/32* (2014.01)
*B61C 17/00* (2006.01)
*H02J 3/38* (2006.01)
*H02J 50/10* (2016.01)
*H02S 20/30* (2014.01)

(52) U.S. Cl.
CPC .............. *H02S 40/32* (2014.12); *B61C 17/00* (2013.01); *H02J 3/38* (2013.01); *H02J 50/10* (2016.02); *H02S 20/30* (2014.12); *H02J 2300/26* (2020.01)

(58) Field of Classification Search
CPC .......... H02S 40/32; H02S 20/30; H02J 50/10; H02J 3/38; H02J 2300/26; B61C 17/00
(Continued)

(56) References Cited

U.S. PATENT DOCUMENTS 6,240,318 B1 * 5/2001 Phillips ................ A61N 1/3787
607/61
9,601,261 B2 * 3/2017 Schatz ...................... H03H 7/40
(Continued)

FOREIGN PATENT DOCUMENTS

CH            679296 A5      1/1992
CN         104967190 A     10/2015
(Continued)

OTHER PUBLICATIONS

Raizada Shirish et al, "Step Up Gain Converter with fast MPPT control under moving partial shading for train rooftop PV-DC-G", 2018 IEEE International Conference on Electrical Systems for Aircraft, Railway, Ship Propulsion and Road Vehicles & International Transportation Electrification Conference (ESARS-ITEC), IEEE,Nov. 7, 2018 (Nov. 7, 2018), p. 1-6, XP033498184, DOI: 10.1109/ESARS-ITEC.2018.8607357, the whole document.
(Continued)

*Primary Examiner* — Alfonso Perez Borroto
(74) *Attorney, Agent, or Firm* — Laurence A. Greenberg; Werner H. Stemer; Ralph E. Locher

(57) ABSTRACT

A method for controlling a power transmission. Electrical power is formed by a photovoltaic system and the power goes to a primary side of an inductive transformer. The power goes from the primary side of the inductive transformer to a secondary side of the inductive transformer. The power then goes from the secondary side of the inductive transformer to an electrical component. The photovoltaic system is operated on an outer surface of a rail vehicle, while
(Continued)

the electrical component is operated inside the rail vehicle. The power control required for the power transmission between the photovoltaic system and the component is carried out on the secondary side and takes place in such a way that a control target which is predetermined by the electrical component is achieved. The power control determines how much power is taken from the transformer on the secondary side and fed to the component.

6 Claims, 2 Drawing Sheets

(58) Field of Classification Search
USPC .......................................................... 307/9.1
See application file for complete search history.

(56) References Cited

U.S. PATENT DOCUMENTS

| | | | |
|---|---|---|---|
| 10,084,348 B2 * | 9/2018 | Kesler | ..................... H02J 50/90 |
| 2012/0228954 A1 * | 9/2012 | Kesler | ..................... H03H 7/40 |
| | | | 307/104 |
| 2014/0312706 A1 | 10/2014 | Fiorello et al. | |
| 2015/0123484 A1 * | 5/2015 | Kurs | ..................... B60L 3/0069 |
| | | | 307/104 |
| 2016/0288805 A1 | 10/2016 | Bachmayer | |
| 2017/0346345 A1 * | 11/2017 | Kurs | ..................... H04B 5/79 |
| 2019/0061533 A1 | 2/2019 | Wang et al. | |

FOREIGN PATENT DOCUMENTS

| | | |
|---|---|---|
| DE | 102017009720 A1 | 4/2018 |
| DE | 102020100318 A1 | 3/2021 |
| KR | 1020150126531 A | 11/2015 |
| WO | 2015082108 A1 | 6/2015 |

OTHER PUBLICATIONS

Esram, et al: Comparison of Photovoltaic Array Maximum Power Point Tracking Techniques; IEEE Transactions on Energy Conversion, vol. 22, No. 2; Jun. 2007 pp. 439-449.

* cited by examiner

METHOD FOR POWER CONTROL

FIELD AND BACKGROUND OF THE INVENTION

The invention relates to a method for controlling a transmission of electrical power that is formed by a photovoltaic installation of a rail vehicle and transmitted to an electrical component of the rail vehicle.

It is known practice, in the case of a rail vehicle, to use a photovoltaic installation that is arranged on the outer surface of the rail vehicle. This involves solar energy being used to form an electrical power that is then transmitted to an electrical component or load (consumer or storage unit) inside the rail vehicle.

It is also known practice, in the case of a photovoltaic installation, to carry out power control using what is known as a maximum power point tracking (MPPT) method in order to transmit power from the photovoltaic installation to an electrical load (consumer or storage unit) connected thereto.

In the case of this power control, what is known as a maximum power point (MPP) is ascertained for the photovoltaic installation or for a solar module as the point of an associated current-voltage characteristic curve at which the solar module produces its maximum power.

The maximum power point MPP is dependent on the solar radiation, on the temperature and on individual module properties, as a result of which it can constantly change.

The maximum power point MPP is ascertained using what is known as an MPP tracker MPPT, which, from a circuitry point of view, forms a variable electrical load of the photovoltaic installation to which the power of the photovoltaic installation is transmitted. This load is optimally set if the maximum power drawn from the solar module is in equilibrium with the power that is required or consumed at the load for the purpose of further processing.

The MPP tracker is implemented by an inverter that converts DC voltage of the photovoltaic installation to an AC voltage for mains operation and that can be connected as a boost converter, a buck converter or an inverter. If instead of mains operation, it is intended to store the power of the photovoltaic installation, a converter is connected downstream of the inverter and forms a DC voltage for the energy storage unit (battery) from the AC voltage.

In the MPPT method, a transmission of power is therefore controlled or set in such a way that the greatest possible power is drawn from the photovoltaic installation in order to supply it to the electrical load.

The MPPT method is based on the evaluation of electrical parameters (current, voltage) along the electrically conductive connection between the photovoltaic installation and the load. The parameters are monitored or obtained at the photovoltaic installation and at the electrical load directly connected thereto.

When using a photovoltaic installation that is arranged on the outer surface of the rail vehicle, this direct, electrically conductive connection between the photovoltaic installation and the load, which is arranged inside the rail vehicle, is possibly not desired for safety reasons. Required protection of the interior of the rail vehicle against high-voltage inputs prevents the use of the direct, electrically conductive connection between the photovoltaic installation and component or load.

This also eliminates the possibility of using the MPPT method that is known for the photovoltaic installation and is described above.

SUMMARY OF THE INVENTION

It is therefore the object of the present invention to specify a method for controlling an electrical power that is formed by a photovoltaic installation of a rail vehicle and is transmitted to an electrical component or load of the rail vehicle.

This object is achieved by the features as claimed. Advantageous developments of the invention are specified in the dependent claims.

The invention relates to a method for controlling a transmission of power from a photovoltaic installation to an electrical component that is a consumer or a storage unit, for example.

The photovoltaic installation used for the formation of power is arranged on an outer surface of the rail vehicle, whereas the electrical component is arranged inside the rail vehicle.

The power is transmitted via an inductive transformer that is connected between the photovoltaic installation and the component. This achieves galvanic isolation between the photovoltaic installation and the component, with the result that the component is protected against effects of high-voltage damage acting on the photovoltaic installation.

The inductive transformer transforms DC voltage to DC voltage and therefore contains a series circuit comprising a DC/AC converter followed by two coils inductively coupled to one another and a downstream AC/DC converter.

A power control necessary for the transmission between the photovoltaic installation and the component is provided between the inductive transformer and the electrical component, and therefore on the secondary side with regard to the transformer.

The power control determines how much power is drawn from the secondary side of the transformer in order to guarantee a control target.

The control target is in turn determined by the electrical component.

If the component is a battery, the control target is determined by a charging capability or capacity of the battery and/or by an intended or predetermined charging time of the battery.

In a preferred first configuration of the invention, the power control is based on parameters (current, voltage and/or power) that are tracked over time and captured (preferably exclusively) between the inductive transformer and the electrical component. With respect to the inductive transformer, this side is referred to as the secondary side.

The power control itself is carried out by way of a load change that acts on the secondary side. This load is adjusted so as to carry out a maximized transmission of power from the photovoltaic installation to the electrical component with as few interruptions as possible.

The control of the transmission of power is carried out on the basis of the secondary-side parameters in successive, preferably iterative, steps.

This is shown in detail by way of example below and with reference to a step sequence:

In a first step, for the secondary-side draw of power at the inductive transformer,
a starting value is determined for this power. By way of example, for this purpose
a starting value that represents the secondary-side power is predetermined for an output voltage of the transformer.

In a second step, a check is carried out to determine whether the power demanded on the secondary side can also be delivered by the primary side of the transformer.

If the output voltage of the inductive transformer collapses on the secondary side, too little power is available on the primary side for transmission. In this case, a fifth step that is described below is carried out.

If, however, the output voltage of the inductive transformer does not collapse on the secondary side, sufficient power is available on the primary side for transmission. In this case, a third step that is described below is carried out.

In the third step, a check is carried out to determine whether an increased power could be processed by the component or load.

If this is not the case, the transmission of power continues unchanged.

If this is the case, a fourth step that is described below is carried out.

In the fourth step, this increased power is determined or calculated and used as a new starting value. Subsequently, the described step sequence is carried out again starting with the second step.

In the fifth step, which follows in the event of the transmission of power being interrupted, the secondary-side draw of power has to be reduced.

The starting value is accordingly reduced proceeding from the last starting value, and is used as a new starting value. Subsequently, the described step sequence is carried out again starting with the second step.

Both the reduction and the increase are adjusted using algorithms.

In a preferred second configuration of the invention, the power control is based on parameters (current, voltage and/or power) that are tracked over time and captured (preferably exclusively) between the photovoltaic installation and the inductive transformer. With respect to the inductive transformer, this side is referred to as the primary side. These parameters are preferably captured directly at the photovoltaic installation.

The primary-side parameters are preferably transmitted to the secondary-side power controller as data or as representative characteristic values using a short-range communication method (e.g. Bluetooth transmission, near-field communication (NFC), laser or light-based data transmission, etc.) on a separate transmission path that is provided independently of and in parallel with the transmission of power.

The power control is preferably carried out with the aid of the MPPT method, which is known and described at the outset, and on the basis of the transmitted parameters.

The power control itself is carried out by way of a load change that acts on the secondary side. This load is adjusted so as to ensure a maximized transmission of power from the photovoltaic installation to the electrical component with as few interruptions as possible.

If there is more power available on the primary side than is required on the secondary side, the power control is limited, for example a limit to a fixed, maximum voltage is predetermined as a control target.

Appropriate mixed forms of the two described configurations for monitoring and using the parameters are possible.

It is therefore possible, for the power control, to combine parameters of the secondary side with parameters of the primary side and to use them with one another for the power control.

Preferred developments are mentioned below with respect to these two configurations.

In one preferred development, the electrical component is in the form of an energy storage unit or of a battery.

For this application, a controllable DC/DC converter is provided between the inductive transformer and the component, using which converter the power control is carried out by way of optimized voltage matching.

In one preferred development, the electrical component is operated as an electrical load.

For this application too, a controllable converter or DC/DC converter is provided between the inductive transformer and the component, using which converter the power control is carried out by way of optimized voltage matching.

In one preferred development, the transmission of power is controlled or changed slowly or with small increments in order to set an optimized transmission of power with respect to the maximum power point MPP of the photovoltaic installation.

The invention makes it possible to control a transmission of power that is carried out via the inductive transformer in a galvanically isolated manner. This achieves protection against hazardous voltages.

The invention makes it possible to control the transmission of power in an optimized manner so as to counter both temporary changes at the photovoltaic installation, such as those caused by clouds, for example, and also long-term changes at the photovoltaic installation, such as those caused in the evening or morning by twilight, for example.

The power formed by the photovoltaic installation fluctuates. The transmission may break down in the event of an increased draw of power or power demand on the secondary side. The invention makes it possible to keep the associated losses or consequences as low as possible or to reduce them.

BRIEF DESCRIPTION OF THE FIGURES

The invention therefore provides low-loss, fast and reliable control that is able to be achieved with little outlay and low costs.

The present invention is explained in more detail below by way of example with reference to a drawing, in which.

DETAILED DESCRIPTION OF THE INVENTION

Figure 1:
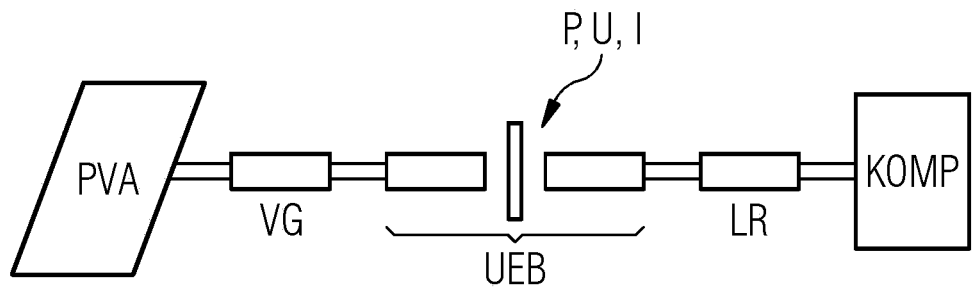
FIG. 1 shows a first exemplary application for the present invention.

FIG. 1 shows a first exemplary application for the present invention.

A photovoltaic installation PVA is arranged on an outer side of a rail vehicle in order to generate energy, whereas an electrical component KOMP, for example a consumer or an energy storage unit, is arranged inside the rail vehicle.

For safety reasons, power is transmitted from the photovoltaic installation PVA to the electrical component KOMP via an interposed inductive transformer UEB.

The inductive transformer UEB transforms DC voltage to DC voltage and for this purpose contains a series circuit comprising a DC/AC converter followed by two coils inductively coupled to one another and a downstream AC/DC converter.

A ballast VG may be provided between the photovoltaic installation PVA and the transformer UEB and may be used to carry out voltage matching in such a way that the inductive transformer is operated in an optimum range at every operating point of the photovoltaic installation PVA.

Correspondingly, a DC/DC converter may be provided as a downstream device (not shown here) between the photovoltaic installation PVA and the component KOMP.

Necessary ballasts and downstream devices for operating a transformer in a DC grid are known and are not explained in any more detail here.

A power controller LR may be connected between the inductive transformer UEB and the electrical component KOMP and is used to carry out the power control that is preferably carried out as voltage control.

If the electrical component or load KOMP is an energy storage unit, a DC/DC converter is connected as a power controller LR between the inductive transformer UEB and the component KOMP, using which converter the power control is carried out by way of optimized voltage matching.

Electrical parameters (current I, voltage U and/or power P) of the power available on the secondary side with respect to the transformer UEB are monitored over time between the inductive transformer UEB and the electrical component KOMP.

Figure 2:
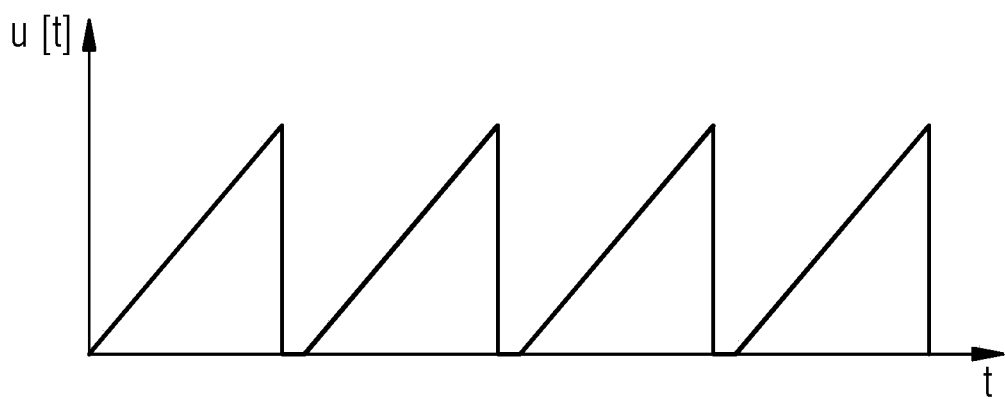
FIG. 2 shows, with reference to FIG. 1, a first characteristic curve view for the present invention.

FIG. 2 shows, with reference to FIG. 1, a first characteristic curve view for the present invention.

If, on the secondary side of the transformer UEB, an increased power is drawn or demanded by the component KOMP without control according to the invention, a power provided via the photovoltaic installation PVA possibly cannot meet this demand. As a result, a secondary-side output voltage as a parameter assumes a value $u(t)=0$ V, and the voltage dips.

The transmission of power breaks down and the control for the transmission of energy or power is restarted.

If this process is repeated, the typical sawtooth curve that is shown in FIG. 1 is produced.

Although the control, which is shown here, of the transmission of power is simple, it is time-consuming and impacted by losses.

Figure 3:
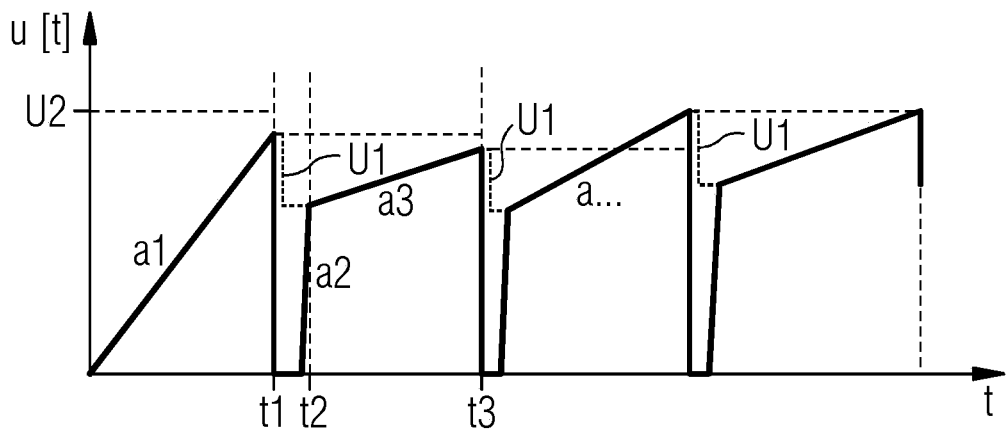
FIG. 3 shows, with reference to FIG. 1 and FIG. 2, a second characteristic curve view for the present invention.
Figure 4:
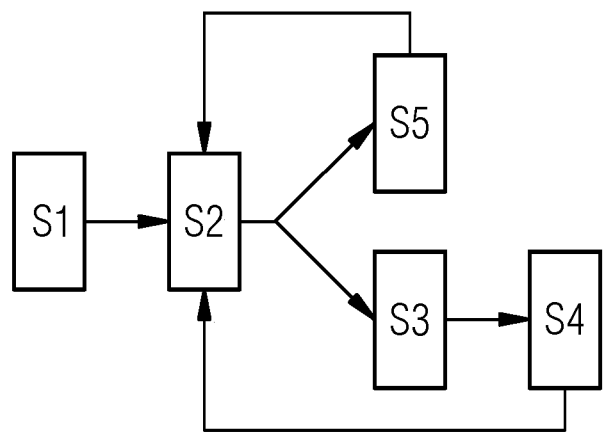
FIG. 4 shows, with reference to FIG. 1 to FIG. 3, the associated flow diagram for the present invention.

FIG. 3 shows, with reference to FIG. 1, a second characteristic curve view for the present invention, whereas FIG. 4 shows, with reference to FIG. 3, the associated flow diagram.

In the observations that follow, the secondary-side power is represented by a voltage U or u(t) as parameter.

In a first step, for the secondary-side draw of power at the inductive transformer UEB, a starting value is determined for this power. By way of example, for this purpose a starting value that represents the secondary-side power is predetermined for an output voltage of the transformer $u(t<t1)=U1$.

In a second step, a check is carried out to determine whether the power demanded on the secondary side can also be delivered by the primary side of the transformer UEB.

If the output voltage $u(t=t1)=0$ collapses on the secondary side of the inductive transformer UEB, too little power is available on the primary side for transmission. In this case, a fifth step that is described below is carried out.

If, however, the output voltage $u(t<t1)$ of the inductive transformer does not collapse on the secondary side, sufficient power is available on the primary side for transmission. In this case, a third step that is described below is carried out.

In the third step, a check is carried out to determine whether an increased power is able to be processed by the component or load KOMP. If this is the case, a fourth step that is described below is carried out.

In the fourth step, this increased power is determined or calculated and a corresponding, new, increased starting value U1 is used with regard to the voltage $u(t<t1)=U$.

Subsequently, the described step sequence is carried out again starting with the second step.

In the fifth step, which follows in the event of the transmission of power being interrupted, the secondary-side draw of power has to be reduced.

A new, lower starting value U1 is accordingly determined proceeding from the voltage $u(t1)=U2$. With this reduced voltage U1 (where U1<U2), the described step sequence is carried out again starting with the second step.

Both the increase, occurring in the form of a linear ramp a1, a2, . . . , and the reduction described above are adjusted using algorithms.

This sequence of the steps is repeated, resulting in the profiles a1, a2 correspondingly shown for $t2<t<t3$, $t=t3$, $t>t3$.

The downtimes following the deactivation are technologically required by the inductive transformer (UEB). They are kept as short as possible.

Figure 5:
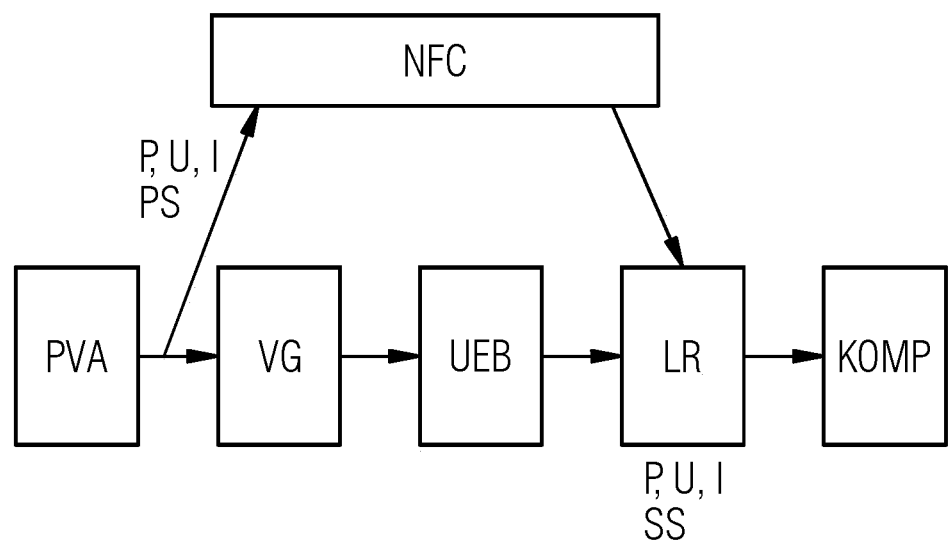
FIG. 5 shows a second exemplary application for the present invention.

FIG. 5 shows a second exemplary application for the present invention.

Again, the photovoltaic installation PVA is arranged on an outer side of a rail vehicle in order to generate energy, whereas the electrical component or load KOMP, for example a consumer or an energy storage unit, is arranged inside the rail vehicle.

For safety reasons, power is transmitted from the photovoltaic installation PVA to the electrical component KOMP via the interposed inductive transformer UEB.

A ballast VG may be provided on the side of the photovoltaic installation PVA and is connected between the photovoltaic installation PVA and the inductive transformer UEB.

The ballast may be used to carry out voltage matching so as to operate the inductive transformer UEB in an optimum range at every operating point.

A power controller LR may be connected between the inductive transformer UEB and the electrical component KOMP and is used to carry out the power control by way of load matching.

Electrical parameters (current I, voltage U and/or power P) of the power available on the secondary side with respect to the transformer are monitored over time between the inductive transformer UEB and the electrical component KOMP.

These parameters of the secondary side SS are supplied to the power controller LR.

In the second configuration of the invention that is shown here, the power control is carried out with the aid of the MPPT method, which is known and described at the outset.

The parameters U, I and/or P of the primary side PS, which are likewise necessary for this purpose, are tracked over time and captured between the photovoltaic installation PVA and the inductive transformer UEB.

The primary-side parameters are preferably transmitted to the secondary side SS or to the power controller LR as data or as representative characteristic values using a wireless transmission method NFC (infrared transmission, radio transmission, short-range communication method, Bluetooth, etc.) on a separate transmission path that is provided independently of and in parallel with the transmission of power via the inductive transformer UEB.

The power control is then carried out by the power controller on the basis of the parameters U, I and/or P obtained on the primary side and on the secondary side.

The invention claimed is:

1. A method for controlling a transmission of power, the method comprising:

generating electrical power by a photovoltaic installation operated on an outer surface of a rail vehicle and passing the electrical power to a primary side of an inductive transformer;

passing the power from the primary side of the inductive transformer to a secondary side of the inductive transformer and from the secondary side of the inductive transformer to an electrical component inside the rail vehicle;

carrying out a power control necessary for the transmission of the electrical power between the photovoltaic installation and the electrical component on the secondary side;

carrying out the power control in such a way that a predetermined control target is achieved by the electrical component;

determining via the power control how much power is drawn from the secondary side of the transformer and supplied to the component;

using electrical parameters for the power control which are exclusively captured, tracked over time, and evaluated between the inductive transformer and the electrical component;

in a first step, determining a starting value of a power for a secondary-side draw of power at the inductive transformer;

in a second step, carrying out a check to determine whether the power demanded on the secondary side can be delivered by the primary side of the transformer;

wherein, if an output voltage of the inductive transformer collapses on the secondary side, which indicates that too little power is available on the primary side for transmission, a fifth step is carried out, as defined below;

wherein, if the output voltage of the inductive transformer does not collapse on the secondary side, which indicates that sufficient power is available on the primary side for transmission, a third step is carried out, as defined below;

in the third step, carrying out a check to determine whether the component is able to process an increased power, and when an increased power can be processed, carrying out a fourth step as defined below;

in the fourth step, determining the increased power and using the increased power as a new starting value, and restarting a step sequence starting with the second step above;

in the fifth step, reducing the secondary-side draw of power by, proceeding from a last-valid starting value, reducing the starting value and using the reduced starting value as a new starting value in order to then carry out the step sequence starting with the second step.

2. The method according to claim 1, wherein the inductive transformer transforms DC voltage to DC voltage and the inductive transformer comprises a series circuit formed of a DC/AC converter, followed by two coils inductively coupled to one another, and followed by an AC/DC converter.

3. The method according to claim 2, which comprises operating the two coils coupled to one another without an iron core.

4. The method according to claim 1, wherein the electrical component is operated as a consumer or as a storage unit.

5. The method according to claim 1, which comprises effecting the power control by way of a load change that acts on the secondary side.

6. The method according to claim 5, which comprises adjusting the load to ensure a maximized transmission of power from the photovoltaic installation to the electrical component with few interruptions.

* * * * *